Oct. 15, 1940.  R. W. WAGNER  2,218,368
REVERSIBLE DRIVE MECHANISM
Filed May 8, 1939  2 Sheets-Sheet 2
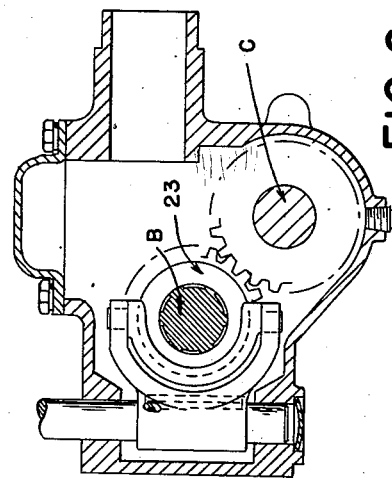
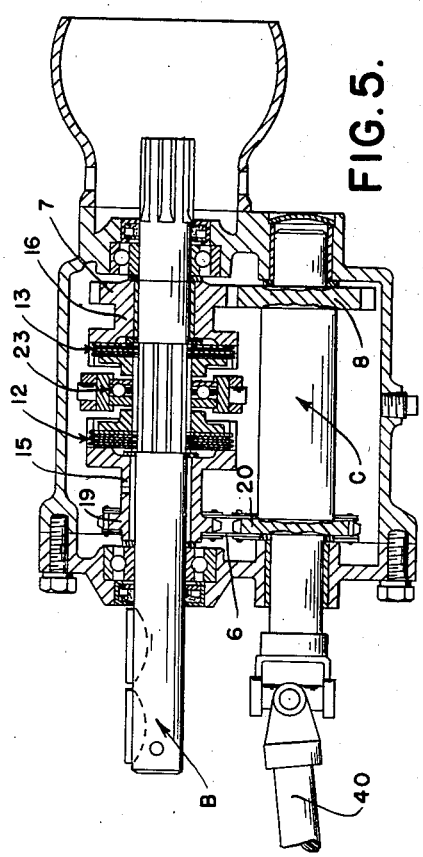
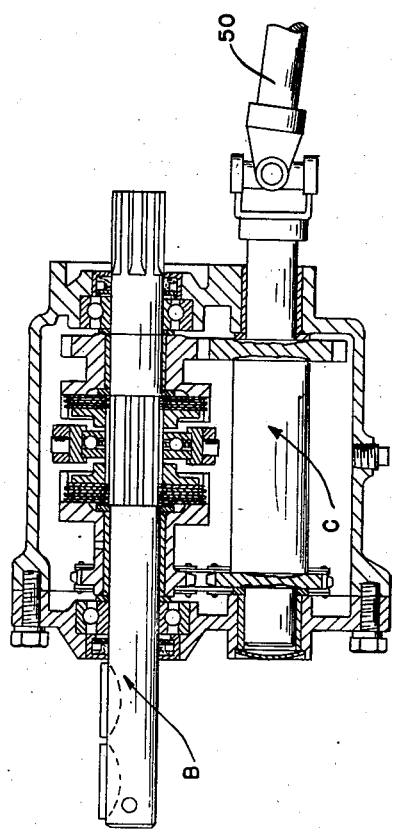
INVENTOR.
ROBERT W. WAGNER
BY
ATTORNEYS Patented Oct. 15, 1940

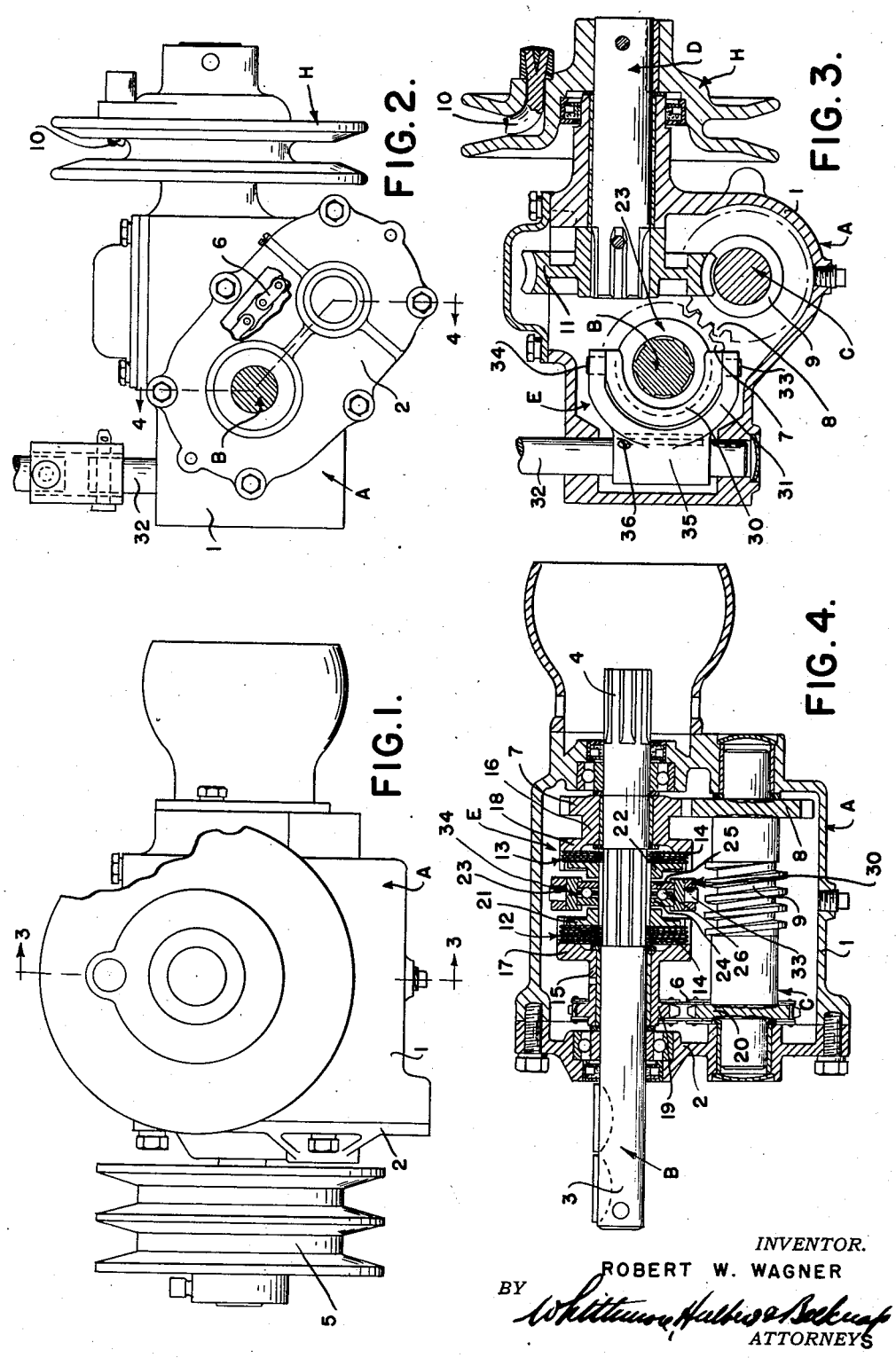

2,218,368

UNITED STATES PATENT OFFICE 2,218,368

REVERSIBLE DRIVE MECHANISM

Robert W. Wagner, Detroit, Mich., assignor to Detroit Harvester Company, Detroit, Mich., a corporation of Michigan Application May 8, 1939, Serial No. 272,512

11 Claims. (Cl. 192—51)

This invention relates generally to driving mechanisms and refers more particularly to reversible drive mechanisms.

One of the essential objects of the invention is to provide a mechanism of this type that is under the control of the operator and that is capable of reversing the drive of parts to be driven substantially instantaneously without stalling the prime mover or power plant.

Another object is to provide a mechanism that may be started and stopped whenever desired without having predetermined starting or stopping periods.

Another object is to provide a mechanism that permits gradual application of the load after being started and that is capable of slipping as a safety feature when subjected to an overload to prevent breakage or damage to parts of such mechanism.

Another object is to provide a mechanism wherein the drive may be effected from either end of the mechanism without affecting the reversible feature thereof.

Another object is to provide a mechanism wherein the shifter element may be provided with suitable locking or retaining means to hold it in forward or reverse position without affecting the safety feature referred to above.

Another object is to provide a mechanism wherein only one thrust bearing is required and is capable of taking the thrust both ways, i. e., in forward or reverse position.

Another object is to provide a mechanism that is comparatively simple in construction, economical to manufacture, and capable of substantially universal use.

Other objects, advantages and novel details of construction of this invention will be made more apparent as this description proceeds, especially when considered in connection with the accompanying drawings, wherein:

Figure 1 is a side elevation of a mechanism embodying my invention;

Figure 2 is an end view thereof;

Figure 3 is a vertical sectional view taken substantially on the line 3—3 of Figure 1;

Figure 4 is a sectional view taken substantially on the line 4—4 of Figure 2;

Figure 5 is a view similar to Figure 4 but showing a slight modification;

Figure 6 is a view similar to Figure 3 but showing the modification illustrated in Figure 5;

Figure 7 is a view similar to Figure 4 but showing another modification.

Referring now to the drawings, A is the housing; B, C and D, respectively, are the power transmitting shafts; and E is the clutch of a mechanism embodying my invention.

As shown, the housing A has a hollow body 1 that may be attached in any suitable manner to any suitable support such as the frame (not shown) of a tractor driven mower, and is provided with a removable end plate 2.

The shaft B is journaled in suitable bearings in the body 1 and end plate 2 of the housing and constitutes the main drive means of my mechanism. One end 3 of this shaft is preferably connected to a prime mover or power plant (not shown) such as the power take-off of the tractor driven motor to which my mechanism may be applied, while the other end 4 may be connected to the cutter mechanism of the mower. For example, a pulley such as 5 for a belt or chain (not shown) from the power plant or power take-off of the tractor may be keyed upon the end 3 of the shaft B, while the other end 4 may be splined as shown for proper engagement with a section of a universal joint or coupling for transmitting the drive to the cutter mechanism of the mower. However, it is to be understood that my mechanism is not limited to a tractor driven mower for it may be used wherever desired in connection with various devices or appliances as will be more apparent as this descripton proceeds.

The shaft C is substantially parallel to the shaft B and is journaled in the body 1 and end plate 2 of the housing. Preferably this shaft is adapted to be driven from the shaft B by either a chain 6 or the cooperating gears 7 and 8, and is provided intermediate its ends with a worm 9. When the shaft C is driven by the chain 6, the direction of rotation thereof is the same as that of the shaft B, but when the shaft C is driven by the gears 7 and 8, then the direction of rotation of the shaft C is opposite or reverse to that of the shaft B.

The shaft D is journaled in the body 1 of the housing and is provided outside the latter with a drum H upon which a cable 10 may be wound. The shaft D is adapted to be driven from the shaft C by a worm gear 11 meshing with the worm 9.

In the present instance the drive from the shaft B to the shaft C by either the chain 6 or the gears 7 and 8, depending upon the direction the shaft C is to be rotated, is through the clutch E which in turn is under the control of the operator. Preferably this clutch E has two sets 12 and 13, respectively, of clutch disks 14 and cooperating sleeves 15 and 16 on the shaft B. As shown, alternate disks 14 of the set 12 are connected to the shaft B and sleeve 15, while alternate disks 14 of the set 13 are connected to the shaft B and sleeve 16. In this connection it will be noted that the sleeves 15 and 16 have substantially cup-shaped portions 17 and 18, respectively, that receive the respective sets 12 and 13 of clutch disks. One sprocket wheel 19 for the chain 6 is preferably integral with the sleeve 15, while the gear 7 is preferably integral with the sleeve 16. The other sprocket wheel 20 and the gear 8 are rigid with the shaft C.

For alternately actuating the sets 12 and 13 of clutch disks relative to the cup-shaped portions 17 and 18 of the sleeves to obtain the desired clutching effect, there are two pressure plates 21 and 22, respectively, and an intermediate thrust bearing 23. As shown, the pressure plates 21 and 22 are mounted for rotary and sliding movement on the shaft B between and serve as followers for the respective sets 12 and 13 of clutch disks, while the thrust bearing 23 is slidable on the shaft B between and serves as an actuator for the pressure plates 21 and 22. Preferably this thrust bearing has a pair of spaced plates 24 and 25 and ball bearings 26 therebetween.

For sliding the thrust bearing 23 back and forth relative to the pressure plates 21 and 22, there is a yoke 30 straddling the plates 24 and 25 of the bearing and actuable by a shifter fork 31 on an operating shaft 32 under the control of the operator. As shown, the yoke 30 extends substantially one-half way around the thrust bearing 23 and is provided at substantially diametrically opposite points with lateral pins 33 and 34, respectively, while the arms of the fork 31 extend circumferentially of the yoke 30 and are pivotally connected to the pins 33 and 34. The hub 35 of the fork is sleeved upon but fastened by a set screw 36 to the operating shaft 32.

In use the shaft B is rotating constantly while the prime mover or power plant of the tractor or other vehicle is operating. When the thrust bearing 23 has been shifted by the shifter mechanism parts 30, 31, and 32 to the left, then the drive is from the shaft B through the set 12 of clutch disks, sleeve 15, sprockets 19 and 20 and chain 6 to the shaft C. The worm 9 on the shaft C and worm gear 11 on the shaft D are constantly in mesh, hence the drive in one direction to the drum H, for example to wind up the cable 10 on the drum, is complete. When it is desired to reverse the drive to the drum H, for example to unwind the cable 10 from the drum H, then the thrust bearing 23 is shifted by the shifter mechanism parts mentioned to the right so that the drive will be from the shaft B through the set 13 of clutch disks, sleeve 16 and gears 7 and 8 to the shaft C. As stated above, the drive from the shaft C through worm 9 and worm gear 11 to the drum shaft D is constant while the shaft B is operating. When the thrust bearing 23 is centered relative to or is free of engagement with both pressure plates 21 and 22, i. e., in neutral position, then both the chain and the gears 7 and 8 as well as the shafts C and D and associated parts are idle.

Regardless of which way the thrust bearing 23 is shifted, i. e., to the left or to the right into and out of operative engagement with the sets 12 and 13, respectively, of clutch disks, it should be noted that one of the spaced plates 24 and 25 of the thrust bearing remains idle while the other turns on the shaft B with the particular pressure plate 21 or 22 with which it is engaged. For example, if the thrust bearing 23 is shifted into operative engagement with the pressure plate 21, then plate 24 of the thrust bearing will rotate with pressure plate 21, while the other plate 25 of the thrust bearing will be idle. The reserve is true when the thrust bearing 23 is shifted into operative engagement with the pressure plate 22. Thus, such arrangement prevents undue wear on the shifter yoke 30 which straddles the thrust bearing.

Due to the construction and arrangement of parts, my mechanism may be used with vehicles, machines or boats of various types for various purposes. For example, the mechanism with cable drum H as described above may be used with a motor driven vehicle such as tractor or truck as a power lift assembly or attachment or such mechanism without the cable drum H and associated parts may be used with motor driven vehicles, machines or boats as the driving mechanism therefor.

As illustrated in Figures 5 and 6, the worm 9, worm gear 11, shaft D and drum H may be dispensed with entirely and a propeller shaft such as 40 for suitable mechanism or parts to be driven (not shown) may be connected to one end of the shaft C. Thus, when the shaft B is rotating, power may be transmitted therefrom through the set 12 of clutch disks, sleeve 15, sprocket wheels 19 and 20 and chain 6 to shaft C and from the latter to the propeller shaft 40, or may be through set 13 of clutch disks, sleeve 16, gears 7 and 8 to shaft C, and from the latter to the propeller shaft 40. However, if desired, the whole arrangement may be reversed end for end. For example, the drive from the prime mover (not shown) may be to an extension of the shaft C instead of to the shaft B in which event the drive would be from shaft C through either the chain 6 or gears 7 and 8, depending upon the position of the thrust bearing 23, to the shaft B which would in such instance be the propeller shaft, or may be connected to one.

It is of course also apparent that a shaft such as 50 may be connected to the other end of the shaft C, as illustrated in Figure 7, or shafts may be connected to both ends of the shaft C, as desired.

Thus, one or more shafts such as the propeller shafts 40 and 50 could be connected to the shaft C, and the driving means such as a chain or belt from a prime mover could be connected to a pulley such as 5 on either the shaft B, as in Figure 4; shaft 40, as in Figure 6; or shaft 50, as desired.

From the foregoing it will be apparent that both driving connections, i. e., the chain 6 or gears 7 and 8 are under the control of the clutch E which in turn is under the control of the operator. Moreover, either driving connection may be made effective by manipulation of the clutch without stalling the prime mover or power plant. The operating shaft 32 may be operated at will, hence there is no predetermined starting or stopping periods. Due to the arrangement of clutch disks 12 and 13, the load will be applied gradually after the thrust bearing 23 has been shifted. Moreover, this arrangement of clutch disks will permit a certain amount of slippage as a safety feature when the driving mechanism is subjected to an overload, consequently breakage or other damage to the working parts of such mechanism is obviated.

What I claim as my invention is:

1. In a driving mechanism of the class described, a rotating shaft, sleeves spaced apart on said shaft and free with respect thereto, driving means operable by said sleeves, and means controlling the operation of said sleeves including two sets of clutch disks on said shaft, one set for each sleeve, alternate disks of each set being connected to said shaft and the respective sleeves, pressure plates on said shaft between said sets of clutch disks, one for each set, and actuating means for said pressure plates including a thrust bearing on said shaft having spaced plates engageable with said pressure plates, and anti-friction means between said spaced plates, one of said spaced plates being capable of remaining idle while the other is in operative engagement with its associated pressure plate, and vice versa.

2. In a driving mechanism of the class described, a rotating shaft, sleeves spaced apart on said shaft and free with respect thereto, driving means operable by said sleeves, and means controlling the operation of said sleeves including two sets of clutch disks on said shaft, one set for each sleeve, alternate disks of each set being connected to said shaft and the respective sleeves, pressure plates on said shaft between said sets of clutch disks, one for each set, actuating means for said pressure plates including a thrust bearing on said shaft having spaced plates engageable with said pressure plates, and anti-friction means between said spaced plates, one of said spaced plates being capable of remaining idle while the other is in operative engagement with its associated pressure plate, and actuating means for said thrust bearing including a manually operable member straddling said spaced plates.

3. In a driving mechanism of the class described, a rotating shaft, sleeves spaced apart on said shaft and free with respect thereto, driving means operable by said sleeves, and means controlling the operation of said sleeves including two sets of clutch disks on said shaft, one set for each sleeve, alternate disks of each set being connected to said shaft and the respective sleeves, pressure plates on said shaft between said sets of clutch disks, one for each set, actuating means for said pressure plates including a thrust bearing on said shaft having spaced plates engageable with said pressure plates, and anti-friction means between said spaced plates, and actuating means for said thrust bearing including a yoke straddling said spaced plates, an operating shaft, and a yoke carried by said shaft and pivotally connected to said yoke.

4. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, a thrust bearing on said shaft between said pressure plates, said thrust bearing having a pair of spaced plates and anti-friction means therebetween, a yoke straddling said thrust bearing plates, and means for actuating said yoke.

5. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, a thrust bearing on said shaft between said pressure plates, said thrust bearing having individually operable plates mounted for rotary and sliding movement on said shaft and ball bearings between said plates, and actuating means for said thrust bearing including a yoke straddling said individually operable plates.

6. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, a thrust bearing on said shaft between said pressure plates, said thrust bearing having individually operable plates mounted for rotary and sliding movement on said shaft and anti-friction means between said plates, and means for sliding the plates of said thrust bearing relative to the adjacent pressure plates.

7. In a driving mechanism of the class described, a rotating shaft, rotary driving sleeves spaced apart on said shaft and free with respect thereto, two sets of clutch disks on said shaft, one set adjacent each sleeve, some disks of each set being splined upon said shaft and other disks of each set being splined to the respective sleeves, and means for alternately actuating said sets of disks to effect a driving connection between the shaft and respective sleeves including two pressure plates on said shaft, one adjacent each set of disks, and a thrust bearing mounted for rotary and sliding movement on said shaft between said pressure plates and including two individually operable plates and anti-friction means therebetween, said thrust bearing plates being alternately engageable with the adjacent pressure plates.

8. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, and actuating means for said pressure plates including a thrust bearing slidable on said shaft between and alternately engageable with said pressure plates, said thrust bearing having spaced independent plates engageable with adjacent pressure plates, and anti-friction means between said spaced plates.

9. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, and actuating means for said pressure plates including a thrust bearing slidable on said shaft between and alternately engageable with said pressure plates, said thrust bearing having spaced independent plates engageable with adjacent pressure plates, anti-friction means between said spaced plates, and means for actuating said thrust bearing.

10. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, and actuating means for said pressure plates including a thrust bearing slidable on said shaft between and alternately engageable with said pressure plates, said thrust bearing having spaced independent plates engageable with adjacent pressure plates, anti-friction means between said spaced plates, and a yoke straddling but free of said spaced plates.

11. In a driving mechanism of the class described, a rotating shaft, rotary driving sleeves spaced apart on said shaft and free with respect thereto, two sets of clutch disks on said shaft, one set adjacent each sleeve, alternate disks of each set being splined respectively to the shaft and adjacent sleeves, two pressure plates on said shaft between the two sets of clutch disks, one plate for each set, and actuating means for said pressure plates including a thrust bearing slidable on said shaft between and alternately engageable with said pressure plates, said thrust bearing having spaced independent plates engageable with adjacent pressure plates, anti-friction means between said spaced plates, a yoke straddling but free of said spaced plates, and a shifter fork for actuating said yoke.

ROBERT W. WAGNER.